US012288442B2

(12) United States Patent
Cronin

(10) Patent No.: US 12,288,442 B2
(45) Date of Patent: *Apr. 29, 2025

(54) TIME STAMPING PROCESS TO DETERMINE USER BEHAVIORS ON A WAGERING PLATFORM

(71) Applicant: AdrenalineIP, Washington, DC (US)

(72) Inventor: John Cronin, Jericho, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,478

(22) Filed: Feb. 20, 2024

(65) Prior Publication Data

US 2024/0194022 A1 Jun. 13, 2024

Related U.S. Application Data

(63) Continuation of application No. 17/883,179, filed on Aug. 8, 2022, now Pat. No. 11,928,925, which is a continuation of application No. 17/336,753, filed on Jun. 2, 2021, now Pat. No. 11,410,495.

(60) Provisional application No. 63/119,071, filed on Nov. 30, 2020.

(51) Int. Cl.
*G07F 17/32* (2006.01)

(52) U.S. Cl.
CPC ...... *G07F 17/3239* (2013.01); *G07F 17/3237* (2013.01); *G07F 17/3262* (2013.01); *G07F 17/3288* (2013.01)

(58) Field of Classification Search
CPC ............. G07F 17/3239; G07F 17/3237; G07F 17/3262; G07F 17/3288
See application file for complete search history.

(56) References Cited

U.S. PATENT DOCUMENTS

2001/0032169 A1 10/2001 Sireau
2006/0040730 A1 2/2006 Walker et al.
2006/0094506 A1 5/2006 Tarter et al.
2010/0093429 A1 4/2010 Mattice et al.
2011/0212770 A1 9/2011 Ocko et al.
2013/0310156 A1 11/2013 Gadher et al.
2015/0038218 A1 2/2015 Barclay et al.
2015/0072764 A1 3/2015 Sunkada

OTHER PUBLICATIONS

International Search Report and Written Opinion, issued on Jan. 11, 2022, in corresponding International Application No. PCT/2021/061079; 9 pages.
Extended Search Report issued on Aug. 28, 2024, in corresponding European Application No. 21899200.6, 8 pages.

*Primary Examiner* — Kevin Y Kim
(74) *Attorney, Agent, or Firm* — Maier & Maier, PLLC

(57) ABSTRACT

The present disclosure provides a system to time stamp user interactions on a wagering platform or application to determine user behaviors allowing the platform or application to group the users in specific cohorts or groups related to their behaviors on the platform or application. Also, the system provides an AI process that allows the use of a plurality of time-stamped parameters that are used to determine the user behaviors and interactions with the platform or application.

12 Claims, 8 Drawing Sheets

Cohort Creation System

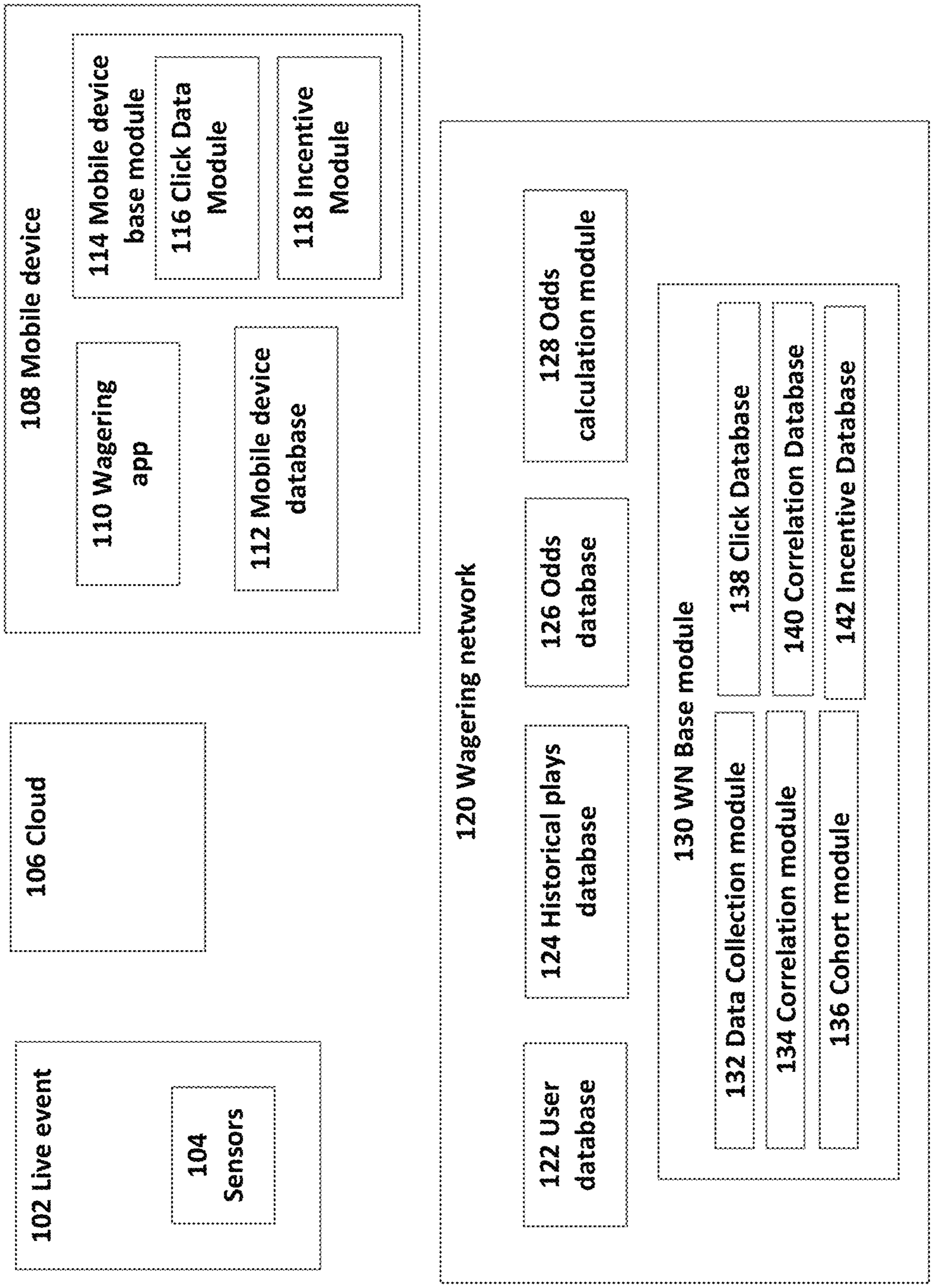
Fig.1 Cohort Creation System

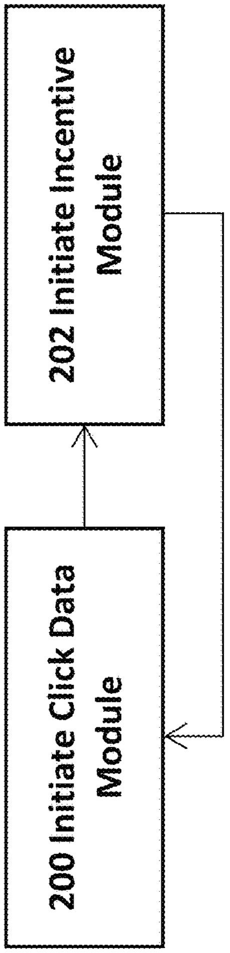
Fig.2 Base Module
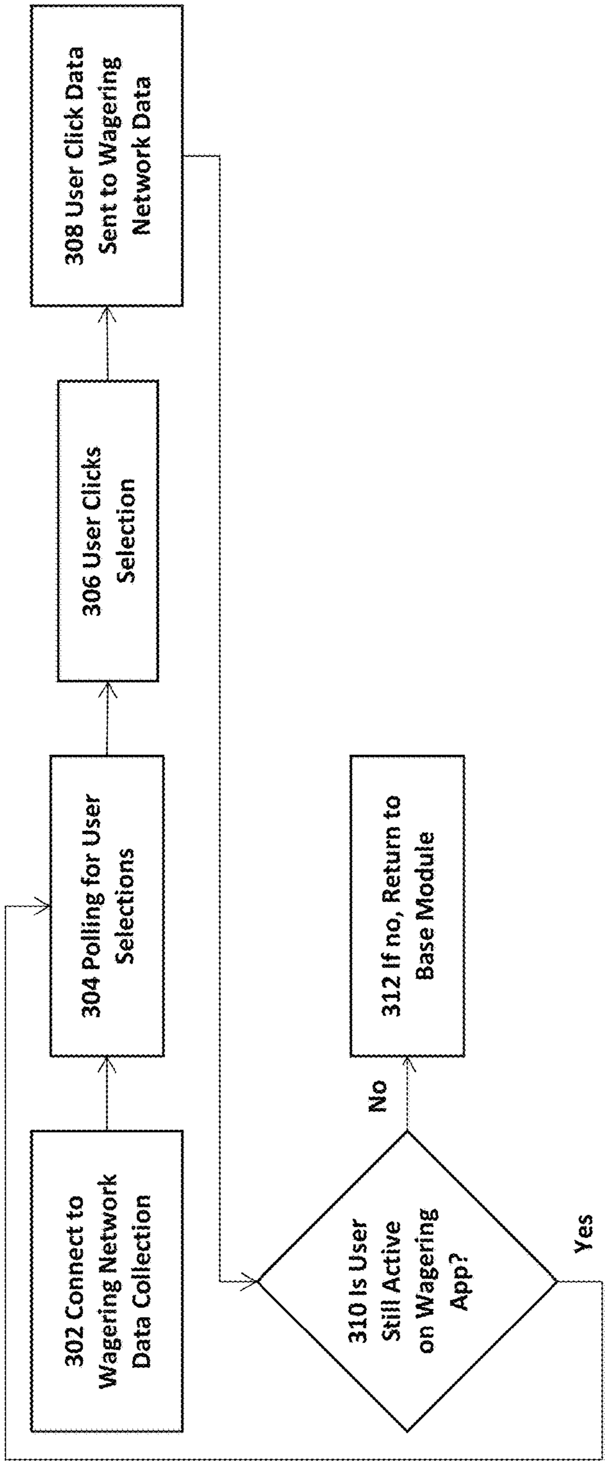
Fig.3 Click Data Module

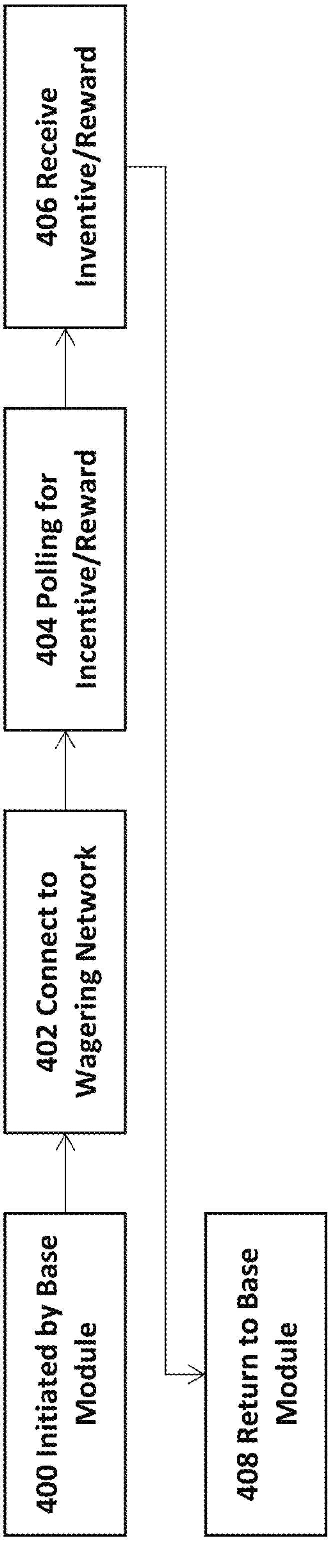
Fig.4 Incentive Module
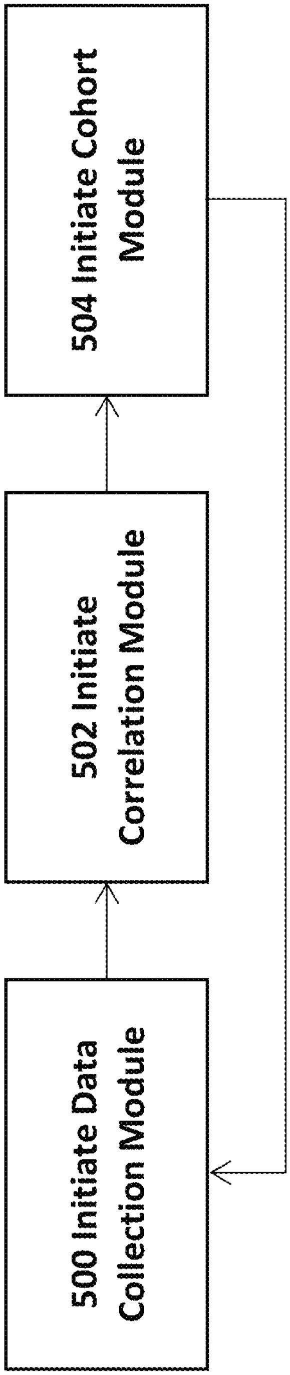
Fig.5 WN Base Module

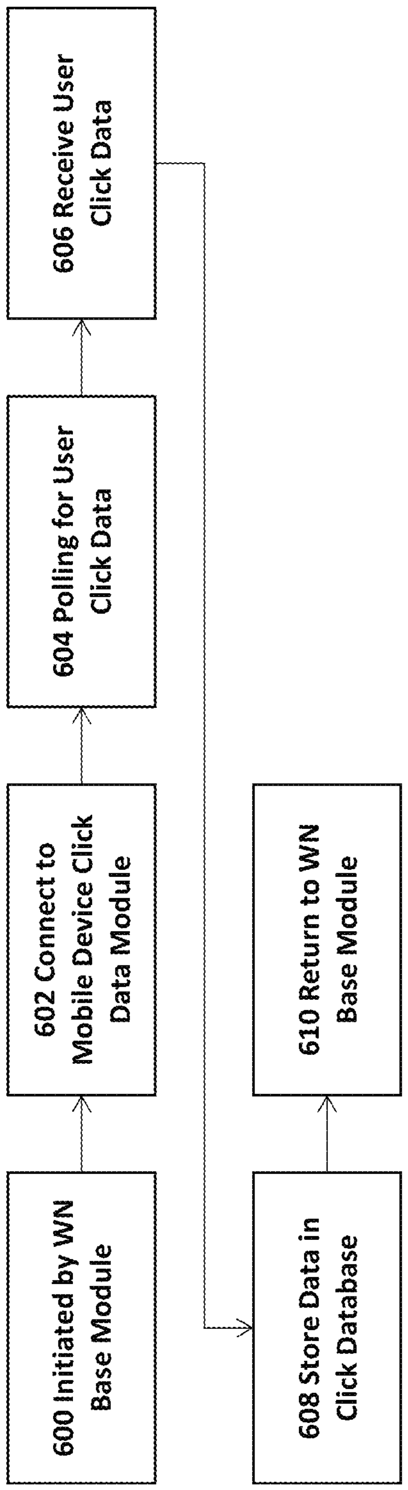
Fig.6 Data Collection Module

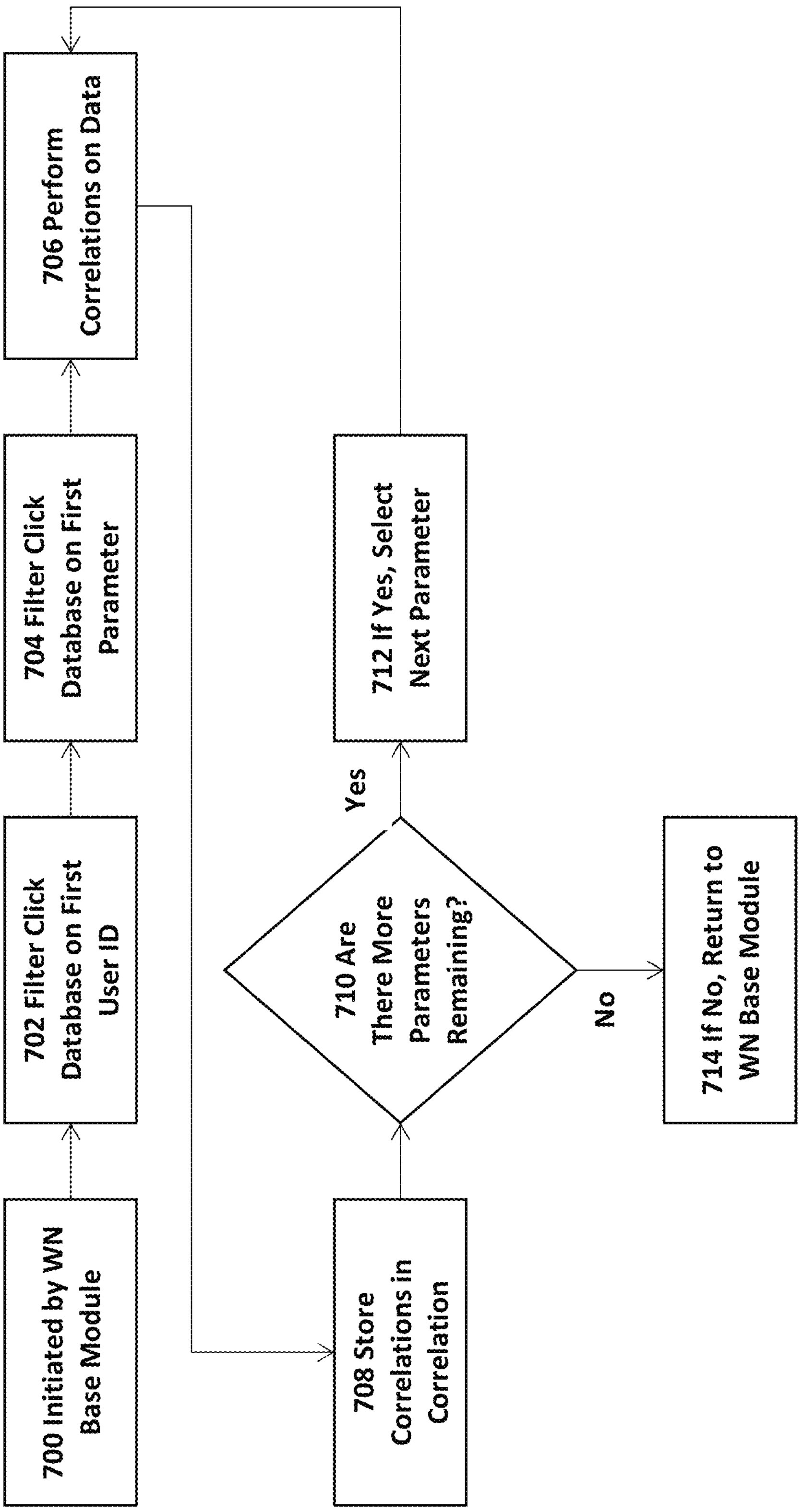
Fig.7 Correlation Module

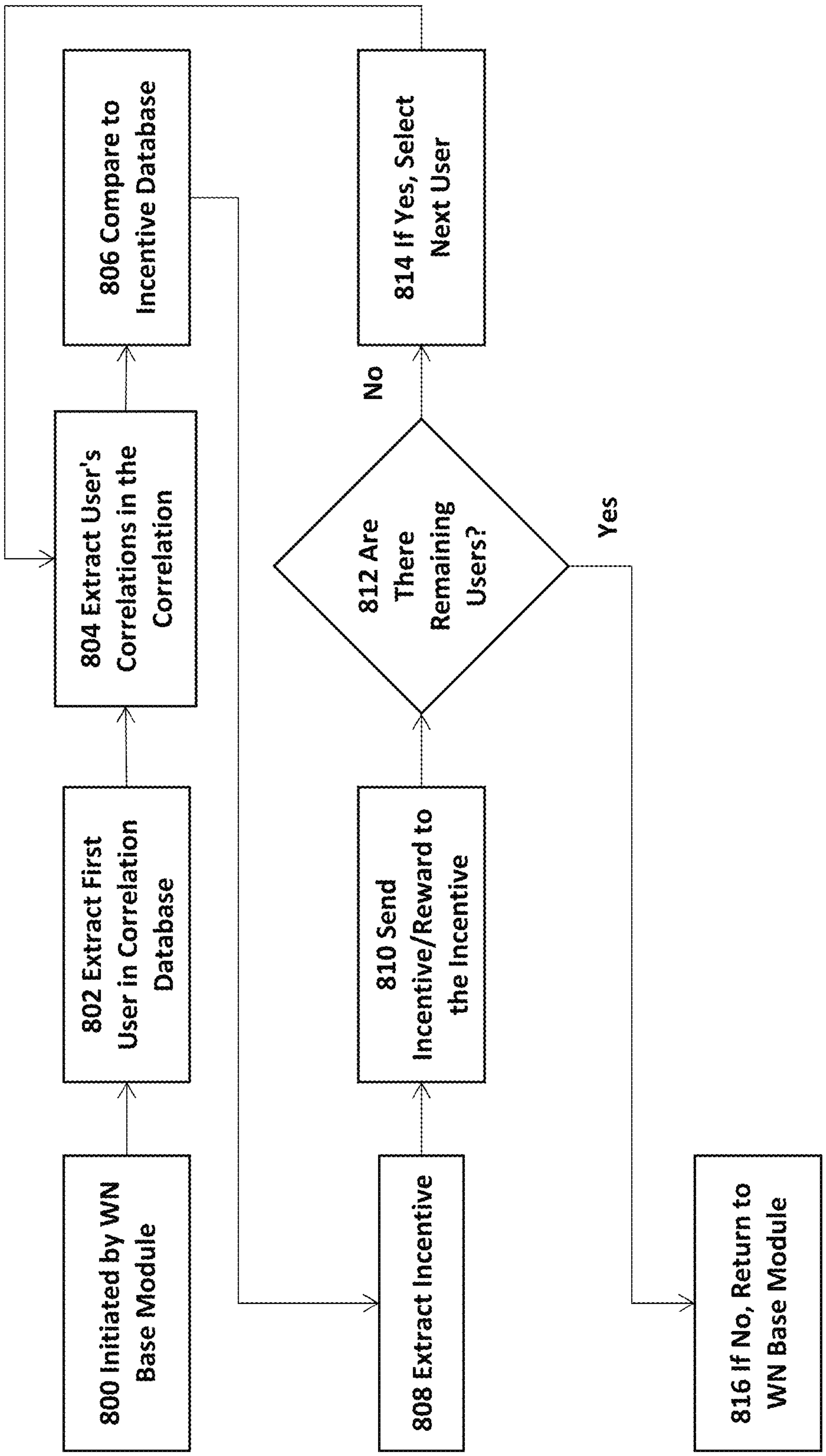
Fig.8 Cohort Module

| User ID | Tim Stamp | Actions | | | | |
|---|---|---|---|---|---|---|
| | | Deposit | Entered Wager Amount | Confirmed Wager | Withdraw | Research |
| JS123456 | 9/7/2020 - 5:00pm EST | X | | | | |
| JS123456 | 9/7/2020 - 5:00pm EST | | | | | |
| JS123456 | 9/7/2020 - 5:30pm EST | | | | | X |
| JS123456 | 9/7/2020 - 8:00pm EST | | X | | | |
| JS123456 | 9/7/2020 - 8:01pm EST | | | X | | |
| JS123456 | 9/8/2020 - 12:00am EST | | | | X | |
| - | - | - | - | - | - | - |
| - | - | - | - | - | - | - |
| - | - | - | - | - | - | - |
| TB12777 | 9/12/2020 11:00am EST | X | | | | |
| TB12777 | 9/12/2020 11:10am EST | | | | | X |
| TB12777 | 9/12/2020 11:30am EST | | X | | | |
| TB12777 | 9/12/2020 11:31am EST | | | X | | |
| TB12777 | 9/12/2020 4:00pm EST | | | | X | |
| - | - | - | - | - | - | - |
| - | - | - | - | - | - | - |
| - | - | - | - | - | - | - |

Fig.9 Click Database

| User ID | Correlations | | | |
|---|---|---|---|---|
| | Profitability vs. Time Between Enter Wager Amount and Confirming Wager | Profitability vs. Time on Research | Profitability vs. # of Wagers per Hour | N |
| JS123456 | 0.5 | 0.48 | 0.89 | - |
| TB12777 | 0.45 | 0.74 | 0.65 | - |
| BH09876 | 0.65 | 0.62 | 0.98 | - |
| - | - | - | - | - |
| - | - | - | - | - |
| - | - | - | - | - |

Fig.10 Correlations Database

| Correlation Ranges | | | Cohort | Incentive/Reward |
|---|---|---|---|---|
| Profitability vs. Time Between Enter Wager Amount and Confirming Wager | Profitability vs. Time on Research | Profitability vs. # of Wagers per Hour | | |
| 0.45-0.65 | >0.75 | >0.70 | 1 - Beginner | Match 50% of Next Deposit |
| 0.35-0.65 | 0.50-0.74 | 0.45-0.69 | 2 - Casual | Free Bet on Game |
| 0.45-0.55 | 0.30-0.49 | >.85 | 3 - Expert | House Credit Available |
| - | - | - | - | - |
| - | - | - | - | - |
| - | - | - | - | - |

Fig.11 Incentive Database

TIME STAMPING PROCESS TO DETERMINE USER BEHAVIORS ON A WAGERING PLATFORM

CROSS-REFERENCE TO RELATED APPLICATIONS

The present patent application is a U.S. Continuation Application of U.S. Utility patent application Ser. No. 17/883,179, filed on Aug. 8, 2022, which is a U.S. Continuation Application of U.S. Utility patent application Ser. No. 17/336,753, filed on Jun. 2, 2021, now U.S. Pat. No. 11,410,495 which claims benefit and priority to U.S. Provisional Patent Application No. 63/119,071 filed on Nov. 30, 2020, the disclosures of which are hereby incorporated by reference.

FIELD

The embodiments are generally related to play by play wagering on live sporting events.

BACKGROUND

Currently, it is difficult on wagering platforms and applications to track the user's interactions with time stamping user actions to determine user behaviors.

Also, another issue on wagering platforms is providing the users with incentives and rewards to continue to use the wagering platform to place wagers based on their behaviors interacting with the platform.

Lastly, it is difficult on wagering platforms to group users into cohorts depending on their behaviors on the wagering platform besides using their profit and loss margins.

SUMMARY

A method and system for marking activity on a sports betting system. In one embodiment, the system can include a live sporting event; one or more mobile devices; a wagering network communicatively connected to the one or more mobile devices; a data collection module on the wagering network; a correlation module on the wagering network; and a cohort module on the wagering network, wherein timestamp data associated with actions performed on the one or more mobile devices are collected by the data collection module and transmitted to the wagering system, the correlation module performs correlations on the timestamps, and a cohort behavior is determined with respect to actions performed on at least one of the one or more mobile devices by the cohort module.

In another embodiment, a method of providing notifications on a wagering system may be provided. The method can include collecting timestamped user activity data on an interface for a wagering network; transmitting the collected timestamped user activity data to a cloud database associated with the wagering network; correlating the collected timestamped user activity data; determining cohort behavior based on the correlated data; and transmitting a notification to the interface, wherein the notification is transmitted automatically and contains information associated with the determined cohort behavior.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a cohort creation system, according to an embodiment.

FIG. 2: illustrates a base module, according to an embodiment.

FIG. 3: illustrates a click data module, according to an embodiment.

FIG. 4: illustrates an incentive module, according to an embodiment.

FIG. 5: illustrates a base module, according to an embodiment.

FIG. 6: illustrates a data collection module, according to an embodiment.

FIG. 7: illustrates a correlation module, according to an embodiment.

FIG. 8: illustrates a cohort module, according to an embodiment.

FIG. 9: illustrates a click database, according to an embodiment.

FIG. 10: illustrates a correlations database, according to an embodiment.

FIG. 11: illustrates an incentive database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a cohort creation system. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 120, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 120 to place bets and provide payment/receive funds based on wager outcomes.

Further, embodiments may include a mobile device database 112 that may store some or all the user's data, the live event 102, or the user's interaction with the wagering network 120. Further, embodiments may include a mobile device base module 114 that initiates a mobile device click data module 116, which collects and sends the user selections or clicks of actions, buttons, prompts, etc. on the wagering app 110 user interface such as deposit funds, enter a wager amount, confirm wager, withdraw funds, click on a research article, select a matchup, game, or event, etc. to a wagering network data collection module 132. Then the mobile device base module 114 initiates a mobile device incentive module 118, which connects to a wagering network cohort module 136 and receives an incentive or reward from the wagering network cohort module 136.

Further, embodiments may include the mobile device click data module 116, which connects to the wagering network data collection module 132. Then the user may click a selection on the wagering app 110 user interface. For example, the user selects or clicks an action, button, prompt, etc., on the wagering app 110 user interface such as deposit funds, enter a wager amount, confirm wager, withdraw funds, click on a research article, select a matchup, game, or event, etc. Then the mobile device click data module 116 is sent to the wagering network data collection module 132. For example, the mobile device click data module 116 send the selection of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID.

Further, embodiments may include the mobile device incentive module 118, which connects to the wagering network cohort module 136. Then the mobile device incentive module 118 continuously polls for the incentive or reward from the wagering network cohort module 136. For example, depending on what cohort or group the user is identified in, such as a beginner, casual, or an expert gambler, the user may receive an incentive or reward from the wagering network cohort module 136 depending on the user's behavioral tendencies derived from the click data that was sent to the wagering network data collection module 132. For example, the rewards may be matching a user deposit up to a certain amount or certain percentage, offering the user a free bet or wager, offering the user a line of house credit, etc. Then the mobile device incentive module 118 receives the incentive or reward from the wagering network cohort module 136. For example, the rewards may be matching a user deposit up to a certain amount or certain percentage, offering the user a free bet or wager, offering the user a line of house credit, etc. In some embodiments, the user may receive a notification on the mobile device 108 that they have received an incentive or reward from the wagering network 120.

Further, embodiments may include the wagering network 120, which may perform real-time analysis on the type of play and the result of a play or action. The wagering network 120 (or the cloud 106) may also be synchronized with game situational data, such as the time of the game, the score, location on the field, weather conditions, and the like, which may affect the choice of play utilized. For example, in an exemplary embodiment, the wagering network 120 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 120 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user. Further, embodiments may include a user database 122, which may contain data relevant to all users of the wagering network 120 and may include, but is not limited to, a user ID, a device identifier, a paired device identifier, wagering history, or wallet information for the user. The user database 122 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 122 may contain betting lines and search queries. The user database 122 may be searched based on a search criterion received from the user. Each betting line may include, but is not limited to, a plurality of betting attributes such as at least one of the live event 102, a team, a player, an amount of wager, etc. The user database 122 may include, but is not limited to, information related to all the users involved in the live event 102. In one exemplary embodiment, the user database 122 may include information for generating a user authenticity report and a wagering verification report. Further, the user database 122 may be used to store user statistics like, but not limited to, the retention period for a particular user, frequency of wagers placed by a particular user, the average amount of wager placed by each user, etc. Further, embodiments may include a historical play database 124 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 126 that contains the odds calculated by an odds calculation module 128—to display the odds on the user's mobile device 108 and take bets from the user through the mobile device wagering app 110. Further, embodiments may include an odds calculation module 128, which utilizes historical play data to calculate odds for in-play wagers.

Further, embodiments may include a WN base module 130, which may initiate the wagering network data collection module 132, which collects and stores the received click data from the mobile device click data module 116, a wagering network correlation module 134, and which performs correlations on all the received click data and stores the resulting correlation coefficients in a wagering network correlation database 140, and the wagering network cohort module 136 which compares the correlation coefficients stored in the wagering network correlation database 140 to a wagering network incentive database 142 to determine which cohort the user belongs to and extracts the corresponding incentive or reward and sends it to the user.

Further, embodiments may include the wagering network data collection module 132, which connects to the mobile device click data module 116. The wagering network data collection module 132 receives the user-click data from the mobile device click data module 116. For example, the mobile device click data module 116 is sending the selections of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID. Then the wagering network data collection module 132 stores the received click data in a wagering network click database 138. For example, the wagering network click database 138 contains the user ids of the various users, the timestamps of an action, selection, or click of the user, and what the action, selection, or click was, such as depositing funds, entering a wager amount, confirming a wager, selecting a research page or article, withdrawing funds, etc. and returns to the WN base module 130.

Further, embodiments may include the wagering network correlation module 134 that filters the wagering network click database 138 on the first user ID and filters the wagering network click database 138 on the first parameter, for example, the times that the user deposited funds into their account. The wagering network correlation module 134 performs correlations on the data. For example, the wagering network click database 138 is filtered on the user ID and one of the parameters, such as user depositing funds into the account or user's profitability for the house (funds the house has gained), and then correlations are performed on the rest of the parameters with the selected parameter that has filtered the database, such as times when the user has entered a wager amount, confirmed a wager amount, selected a research page, withdrew funds, etc. Then the wagering network correlation module 134 stores the correlations in the wagering network correlation database 140 along with the user ID.

Further, embodiments may include the wagering network cohort module 136 which may extract the user ID in the wagering network correlation database 140 and extracts the user's correlation coefficients stored in the wagering network correlation database 140; for example, for user ID JS123456 the correlation coefficients that are extracted are 0.5, for profitability vs. time between entered wager amount and confirmed wager amount, 0.48 for profitability vs. time on the research page, and 0.89 for profitability vs. the number of wagers per hour. Then the wagering network cohort module 136 compares the extracted correlations to the wagering network incentive database 142. For example, the extracted correlation coefficients of 0.5, for profitability vs. time between entered wager amount and confirmed wager amount, 0.48 for profitability vs. time on the research page, and 0.89 for profitability vs. the number of wagers per hour are compared to the correlation coefficient ranges in the wagering network incentive database 142 which allows the system to place a user within a specific cohort or group such as a beginner, casual, or expert gambler. Then the wagering network cohort module 136 extracts the corresponding incentive stored in the wagering network incentive database 142. For example, the user with the user ID JS123456 has correlation coefficients of 0.5 for profitability vs. time between entered wager amount and confirmed wager amount, 0.48 for profitability vs. time on the research page, and 0.89 for profitability vs. the number of wagers per hour, which would put user ID JS123456 in cohort "3—Expert" and the corresponding incentive or reward would be that a line of house credit would be available to the user. Then the wagering network cohort module 136 sends the incentive or reward to the user.

Further, embodiments may include the wagering network click database 138, which contains the user ids of the various users, the timestamps of an action, selection, or click of the user, and what the action, selection, or click was, such as depositing funds, entering a wager amount, confirming a wager, selecting a research page or article, withdrawing funds, etc.

Further, embodiments may include the wagering network correlation database 140, which contains the correlation coefficients stored for each user from the process described in the wagering network correlation module 134. The database contains the user ID, the parameters that are related to the correlation, for example, profitability vs. time between entering a wager amount and confirming wager amount, profitability vs. time on a research page or article, profitability vs. the number of wagers per hour, and N represents the infinite number of combinations of parameters that may have associated correlation coefficients.

Further, embodiments may include the wagering network incentive database 142, which contains correlation coefficient ranges, the corresponding cohort, and incentive or reward for a user. The database is used in the process described in the wagering network cohort module 136 in which a user's correlation coefficients, which are determined in the process described in the wagering network correlation module 134, are extracted from the wagering network correlation database 140 and compared to the wagering network incentive database 142 to determine which cohort or group a user belongs to.

FIG. 2 illustrates the mobile device base module 114. The process begins with the mobile device base module 114 initiating; at step 200, the mobile device click data module 116. For example, the mobile device base module 114 initiates the mobile device click data module 116. Then the mobile device click data module connects to the wagering network data collection module 132. The mobile device click data module 116 continuously polls for the user selections. For example, the mobile device click data module 116 is waiting for the user to select or click an action, button, prompt, etc. on the wagering app 110 user interface such as deposit funds, enter a wager amount, confirm wager, withdraw funds, click on a research article, select a matchup, game, or event, etc. Then the user clicks a selection on the wagering app 110 user interface. For example, the user selects or clicks an action, button, prompt, etc., on the wagering app 110 user interface such as deposit funds, enter a wager amount, confirm wager, withdraw funds, click on a research article, select a matchup, game, or event, etc. Then the mobile device click data module 116 is sent to the wagering network data collection module 132. For example, the mobile device click data module 116 sends the selection of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID. Then it is determined if the user is still active on the wagering app 110, for example, if the user is still logged on to the wagering app 110. If it is determined that the user is still active on the wagering app 110, then the process returns to continuously polling for the user selections. If it is determined that the user is no longer active on the wagering app 110, then the process returns to the mobile device base module 114. Then the mobile device base module 114 initiates, at step 202, the mobile device incentive module 118. Then the mobile device incentive module 118 connects to the wagering network cohort module 136. Then the mobile device incentive module 118 continuously polls for the incentive or reward from the wagering network cohort module 136. For example, depending on what cohort or group the user is identified in, such as a beginner, casual, or an expert gambler, the user may receive an incentive or reward from the wagering network cohort module 136 depending on the user's behavioral tendencies derived from the click data that was sent to the wagering network data collection module 132. For example, the rewards may be matching a user deposit up to a certain amount or certain percentage, offering the user a free bet or wager, offering the user a line of house credit, etc. Then the mobile device incentive module 118 receives the incentive or reward from the wagering network cohort module 136. Then the mobile device incentive module 118 returns to the mobile device base module 114.

FIG. 3 illustrates the mobile device click data module 116. The process begins with the mobile device base module 114 initiating; at step 300, the mobile device click data module 116. Then the mobile device click data module 116 connects, at step 302, to the wagering network data collection module 132. The mobile device click data module 116 continuously polls, at step 304, for the user selections. For example, the mobile device click data module 116 is waiting for the user to select or click an action, button, prompt, etc. on the wagering app 110 user interface such as deposit funds, enter a wager amount, confirm wager, withdraw funds, click on a research article, select a matchup, game, or event, etc. Then the user clicks, at step 306, a selection on the wagering app 110 user interface. For example, the user selects or clicks an action, button, prompt, etc., on the wagering app 110 user interface such as deposit funds, enter a wager amount, confirm wager, withdraw funds, click on a research article, select a matchup, game, or event, etc. Then the mobile device click data module 116 is sent, at step 308, to the wagering network data collection module 132. For example, the mobile device click data module 116 is sending the selection of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID. Then it is determined, at step 310, if the user is still active on the wagering app 110, for example, if the user is still logged on to the wagering app 110. If it is determined that the user is still active on the wagering app 110, then the process returns to step 304, where the mobile device click data module 116 continuously polls for the user selections. If it is determined that the user is no longer active on the wagering app 110, then the process returns, at step 312, to the mobile device base module 114.

FIG. 4 illustrates the mobile device incentive module 118. The process begins with the mobile device base module 114 initiating, at step 400, the mobile device incentive module 118. Then the mobile device incentive module 118 connects, at step 402, to the wagering network cohort module 136. Then the mobile device incentive module 118 continuously polls, at step 404, for the incentive or reward from the wagering network cohort module 136. For example, depending on what cohort or group the user is identified in, such as a beginner, casual, or an expert gambler, the user may receive an incentive or reward from the wagering network cohort module 136 depending on the user's behavioral tendencies derived from the click data that was sent to the wagering network data collection module 132. For example, the rewards may be matching a user deposit up to a certain amount or certain percentage, offering the user a free bet or wager, offering the user a line of house credit, etc. Then the mobile device incentive module 118 receives, at step 406, the incentive or reward from the wagering network cohort module 136. For example, the rewards may be matching a user deposit up to a certain amount or certain percentage, offering the user a free bet or wager, offering the user a line of house credit, etc. In some embodiments, the user may receive a notification on the mobile device 108 that they have received an incentive or reward from the wagering network 120. Then the mobile device incentive module 118 returns, at step 408, to the mobile device base module 114.

FIG. 5 illustrates the WN base module 130. The process begins with the WN base module 130 initiating, at step 500, the wagering network data collection module 132. The wagering network data collection module 132 connects to the mobile device click data module 116. The wagering network data collection module 132 receives the user-click data from the mobile device click data module 116. For example, the mobile device click data module 116 sends the selections of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID. Then the wagering network data collection module 132 stores the received click data in the wagering network click database 138. The wagering network click database 138 contains the user ids of the various users, the timestamps of an action, selection, or click of the user, and what the action, selection, or click was, such as depositing funds, entering a wager amount, confirming a wager, selecting a research page or article, withdrawing funds, etc. and returns to the WN base module 130. Then the WN base module 130 initiates, at step 502, the wagering network correlation module 134. The wagering network correlation module 134 filters the wagering network click database 138 on the first user ID and filters the wagering network click database 138 on the first parameter, for example, the times that the user deposited funds into their account. The wagering network correlation module 134 performs correlations on the data. For example, the wagering network click database 138 is filtered on the user ID and one of the parameters, such as user depositing funds into the account or user's profitability for the house (funds the house has gained), and then correlations are performed on the rest of the parameters with the selected parameter that has filtered the database, such as times when the user has entered a wager amount, confirmed a wager amount, selected a research page, withdrew funds, etc. Then the wagering network correlation module 134 stores the correlations in the wagering network correlation database 140 along with the user ID. The WN base module 130 then initiates, at step 504, the wagering network cohort module 136. The wagering network cohort module 136 extracts the user ID in the wagering network correlation database 140 and extracts the user's correlation coefficients stored in the wagering network correlation database 140; for example, for user ID JS123456 the correlation coefficients that are extracted are 0.5, for profitability vs. time between entered wager amount and confirmed wager amount, 0.48 for profitability vs. time on the research page, and 0.89 for profitability vs. the number of wagers per hour. Then the wagering network cohort module 136 compares the extracted correlations to the wagering network incentive database 142. For example, the extracted correlation coefficients of 0.5, for profitability vs. time between entered wager amount and confirmed wager amount, 0.48 for profitability vs. time on the research page, and 0.89 for profitability vs. the number of wagers per hour are compared to the correlation coefficient ranges in the wagering network incentive database 142 which allows the system to place a user within a specific cohort or group such as a beginner, casual, or expert gambler. Then the wagering network cohort module 136 extracts the corresponding incentive stored in the wagering network incentive database 142. For example, the user with the user ID JS123456 has correlation coefficients of 0.5 for profitability vs. time between entered wager amount and confirmed wager amount, 0.48 for profitability vs. time on the research page, and 0.89 for profitability vs. the number of wagers per hour, which would put user ID JS123456 in cohort "3—Expert" and the corresponding incentive or reward would be that a line of house credit would be available to the user. Then the wagering network cohort module 136 sends the incentive or reward to the user.

FIG. 6 illustrates the wagering network data collection module 132. The process begins with the WN base module 130 initiating, at step 600, the wagering network data collection module 132. Then the wagering network data collection module 132 connects, at step 602, to the mobile device click data module 116. The mobile device click data module 116 collects the user's interactions, such as clicks or selections of an action, button, prompt, etc., on the wagering app 110. Then the wagering network data collection module 132 continuously polls, at step 604, for the user click data from the mobile device click data module 116. For example, the mobile device click data module 116 collects the user's selections or click of an action, button, prompt, etc. on the wagering app 110 user interface such as deposit funds, enter a wager amount, confirm wager, withdraw funds, click on a research article, select a matchup, game, or event, etc. The wagering network data collection module 132 receives, at step 606, the user click data from the mobile device click data module 116. For example, the mobile device click data module 116 is sending the selections of the user such as selecting or clicking an action, button, prompt, etc. on the wagering app 110 user interface such as deposit funds, enter a wager amount, confirm wager, withdraw funds, click on a research article, select a matchup, game, or event, etc. along with the timestamp of the selection and the user's user ID. Then the wagering network data collection module 132 stores, at step 608, the received click data in the wagering network click database 138. For example, the wagering network click database 138 contains the user ids of the various users, the timestamps of an action, selection, or click of the user, and what the action, selection, or click was, such as depositing funds, entering a wager amount, confirming a wager, selecting a research page or article, withdrawing funds, etc. Then the wagering network data collection module 132 returns, at step 610, to the WN base module 130.

FIG. 7 illustrates the wagering network correlation module 134. The process begins with the WN base module 130 initiating, at step 700, the wagering network correlation module 1340. Then the wagering network correlation module 134 filters, at step 702, the wagering network click database 138 on the first user ID. For example, the wagering network correlation module 134 filters the wagering network click database 138 on the user ID JS123456. Then the wagering network correlation module 134 filters, at step 704, the wagering network click database 138 on the first parameter, for example, the times that the user deposited funds into their account. The wagering network correlation module 134 performs, at step 706, correlations on the data. For example, the wagering network click database 138 is filtered on the user ID and one of the parameters, such as user depositing funds into the account or user's profitability for the house (funds the house has gained), and then correlations are performed on the rest of the parameters with the selected parameter that has filtered the database, such as times when the user has entered a wager amount, confirmed a wager amount, selected a research page, withdrew funds, etc. For example, the wagering network click database 138 is filtered on the user ID, and one of the parameters, such as the time between a wager amount, is entered and then confirmed by a user and a user's profitability for the house (funds the house has gained). An example of correlated parameters is with the house profitability vs. the time between a user has entered a wager amount and confirmed the wager amount with a 0.50 correlation coefficient; this correlation is extracted and stored in the wagering network correlation database 140. In another example, the wagering network click database 138 is filtered on the user ID and one of the parameters, such as a user's time spent on a research page and a user's profitability for the house (funds the house has gained). An example of correlated parameters is with the house profitability vs. the time a user has spent on a research page with a 0.48 correlation coefficient, and this correlation is extracted and stored in the wagering network correlation database 140. An additional example may be, the wagering network click database 138 is filtered on the user ID and one of the parameters, such as a user's number of wagers per hour and a user's profitability for the house (funds the house has gained). An example of correlated parameters is with the house profitability vs. the number of wagers per hour with a 0.89 correlation coefficient, and this correlation is extracted and stored in the wagering network correlation database 140. Then the wagering network correlation module 134 stores, at step 708, the correlations from step 708 in the wagering network correlation database 140 along with the user ID. For example, for user ID JS123456 the correlation coefficient of 0.50 for the house profitability vs. the time between a user has entered a wager amount and confirmed the wager amount, the correlation coefficient of 0.48 for the house profitability vs. the time a user has spent on a research page, and the correlation coefficient of 0.89 for the house profitability vs. the number of wagers per hour are stored in the wagering network correlation database 140. Then the wagering network correlation module 134 determines, at step 710, if more parameters are remaining. If it is determined that more parameters are remaining, the wagering network correlation module 134 selects, at step 712, the next parameter and returns to step 706. If it is determined that there are no more parameters remaining, then the wagering network correlation module 134 returns, at step 714, to the WN base module 130.

FIG. 8 illustrates the wagering network cohort module 136. The process begins with the WN base module 130 initiating, at step 800, the wagering network cohort module 136. Then the wagering network cohort module 136 extracts, at step 802, the first user ID in the wagering network correlation database 140, for example, the user ID JS123456. Then the wagering network cohort module 136 extracts, at step 804, the user's correlation coefficients stored in the wagering network correlation database 140, for example, for user ID JS123456 the correlation coefficients that are extracted are 0.5, for profitability vs. time between entered wager amount and confirmed wager amount, 0.48 for profitability vs. time on the research page, and 0.89 for profitability vs. the number of wagers per hour. Then the wagering network cohort module 136 compares, at step 806, the extracted correlations to the wagering network incentive database 142. For example, the extracted correlation coefficients of 0.5, for profitability vs. time between entered wager amount and confirmed wager amount, 0.48 for profitability vs. time on the research page, and 0.89 for profitability vs. the number of wagers per hour are compared to the correlation coefficient ranges in the wagering network incentive database 142 which allows the system to place a user within a specific cohort or group such as a beginner, casual, or expert gambler. Then the wagering network cohort module 136 extracts, at step 808, the corresponding incentive stored in the wagering network incentive database 142. For example, the user with the user ID JS123456 has correlation coefficients of 0.5 for profitability vs. time between entered wager amount and confirmed wager amount, 0.48 for profitability vs. time on the research page, and 0.89 for profitability vs. the number of wagers per hour, which would put user ID JS123456 in cohort "3—Expert" and the corresponding incentive or reward would be that a line of house credit would be available to the user. Then the wagering network cohort module 136 sends, at step 810, the incentive or reward to the mobile device incentive module 118; for example, a notification to user ID JS123456 would be sent notifying that they are eligible for a line of house credit. Then the wagering network cohort module 136 determines, at step 812, if any users are remaining. If it is determined that more users are remaining, the wagering network cohort module 136 selects, at step 814, the next user and returns to step 804. If it is determined that there are no more users remaining, then the wagering network cohort module 136 returns, at step 816, to the WN base module 130.

FIG. 9 illustrates the wagering network click database 138, which contains the user ids of the various users, the timestamps of an action, selection, or click of the user, and what the action, selection, or click was, such as depositing funds, entering a wager amount, confirming a wager, selecting a research page or article, withdrawing funds, etc. In some embodiments, the database may contain additional data such as the sequence of events of a user and how long the sequence took, for example, if the user deposited funds, entered a wager amount, and confirmed a wager within five minutes. In some embodiments, the database may contain how long a user stayed on a page on the wagering network, for example, how long the user took to decide which game, matchup, or event to select. In some embodiments, the database may contain time data broken down by certain periods such as minutes, hours, days, weeks, quarters, years, etc., such as how many bets were placed during that time period.

FIG. 10 illustrates the wagering network correlation database 140, which contains the correlation coefficients stored for each user from the process described in the wagering network correlation module 134. The database contains the user ID, the parameters that are related to the correlation, for example, profitability vs. time between entering a wager amount and confirming wager amount, profitability vs. time on a research page or article, profitability vs. the number of wagers per hour, and N represents the infinite number of combinations of parameters that may have associated correlation coefficients. These correlation coefficients are extracted during the process described in the wagering network cohort module 136 to determine the user's behavioral tendencies and place the user in a cohort or group representing those behaviors such as a beginner, casual, or expert gambler.

FIG. 11 illustrates the wagering network incentive database 142, which contains correlation coefficient ranges, the corresponding cohort, and incentive or reward for a user. The database is used in the process described in the wagering network cohort module 136 in which a user's correlation coefficients, which are determined in the process described in the wagering network correlation module 134, are extracted from the wagering network correlation database 140 and compared to the wagering network incentive database to determine which cohort or group a user belongs to. For example, a user with correlation coefficients of 0.5, for profitability vs. time between entered wager amount and confirmed wager amount, 0.48 for profitability vs. time on the research page, and 0.89 for profitability vs. the number of wagers per hour, which would put user ID JS123456 in cohort "3—Expert" and the corresponding incentive or reward would be that a line of house credit would be available to the user.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A system for marking activity on a wagering system, comprising:

a sporting event;

one or more devices;

a wagering network communicatively connected to a plurality of devices;

a data collection module on the wagering network that is configured to:

collect data associated with actions performed on the plurality of devices, a cohort module on the wagering network that is configured to determine related correlations as the cohort behavior;

a correlation module on the wagering network that is configured to:

perform correlations on the data that create correlated data, compare correlated data to a wagering network database containing cohort information to place the user in a cohort, and determine the cohort behavior of the cohort with respect to actions performed on at least one of the plurality of devices by the cohort module.

2. The system for marking activity on a wagering system of claim 1, further comprising:

a click data module on the wagering network that is configured to continuously poll the plurality of devices for selected actions, wherein each device of the plurality of devices is associated with a user ID.

3. The system for marking activity on a wagering system of claim 2, wherein the click data module is further configured to transmit data associated with the selected actions to the wagering system upon the user selecting an action on an interface of the wagering network that is displayed on the plurality of devices.

4. The system for marking activity on a wagering system of claim 3, wherein the correlation module on the wagering network is further configured to:

process the data transmitted by the click data module, determine correlations related to the selected actions, and associates the determined correlations with the user ID.

5. The system for marking activity on a wagering system of claim 4, wherein the cohort module is further configured to:

process the correlations associated with the user ID, compare the correlations associated with the user ID to a plurality of correlations associated with different user IDs, and group the user ID in a cohort group having the related correlations.

6. The system for marking activity on a wagering system of claim 5, wherein the cohort module is further configured to send a notification to the device associated with the user ID after the cohort behavior associated with the user ID is determined.

7. The system for marking activity on a wagering system of claim 6, wherein the sent notification contains an incentive to place a wager.

8. The system for marking activity on a wagering system of claim 1, wherein the cohort behavior is based on an analysis of at least one of wager history, wager success, available funds, frequency of deposits, and timestamps of interactions with an interface associated with the wagering network.

9. A method for providing notifications on a wagering system, comprising:

collecting user activity data on an interface for a wagering network;

correlating the collected user activity data;

comparing the correlated collected user activity data to a wagering network incentive database to place the user in a cohort, wherein the wagering network database comprises correlated data ranges, a corresponding cohort, and an incentive for a corresponding user;

determining a cohort behavior of the cohort based on the correlated data; and transmitting a notification to the interface, wherein the notification is transmitted automatically and contains information associated with the determined cohort behavior.

10. The method for providing notifications on a wagering system of claim 9, wherein the user activity data comprises one or more actions associated viewing, analyzing, and placing wagers on the wagering network.

11. The method for providing notifications on a wagering system of claim 9, wherein the interface is on a device, further comprising:

displaying the interface and the transmitted notification on the device.

12. The method for providing notifications on a wagering system of claim 9, further comprising:

comparing the correlated data with correlated data associated with a plurality of other users on the wagering network to determine related correlations as the cohort behavior, and grouping the user ID in a cohort group having the related correlations.

* * * * *